Figure 1:
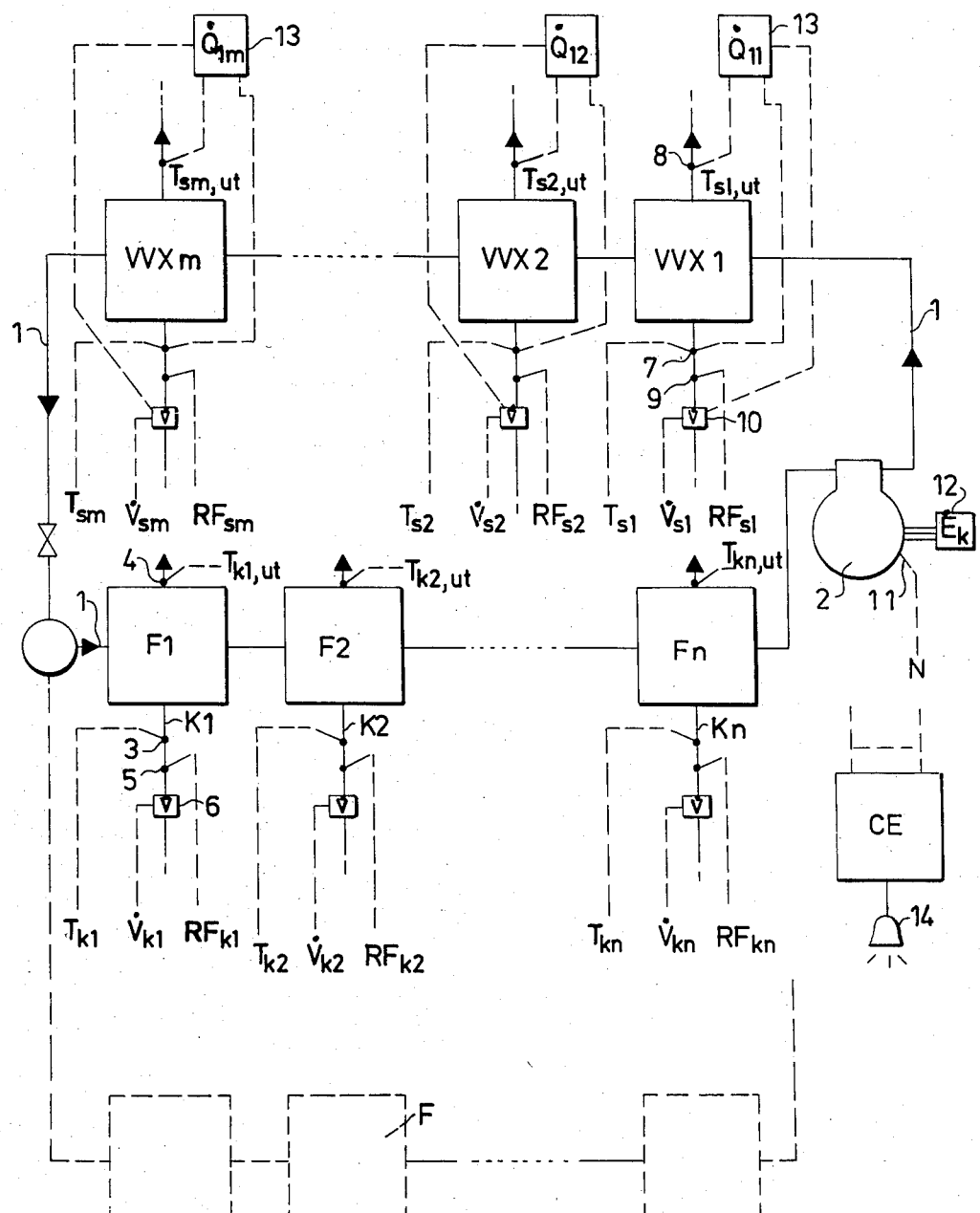

United States Patent [19]

Enström

[11] Patent Number: 4,611,470
[45] Date of Patent: Sep. 16, 1986

[54] METHOD PRIMARILY FOR PERFORMANCE CONTROL AT HEAT PUMPS OR REFRIGERATING INSTALLATIONS AND ARRANGEMENT FOR CARRYING OUT THE METHOD

[76] Inventor: Henrik S. Enström, Fyndevägen 5, 191 47 Sollentuna, Sweden

[21] Appl. No.: 662,031

[22] Filed: Oct. 18, 1984

[51] Int. Cl.[4] .................................. G01K 13/00
[52] U.S. Cl. ................................... 62/127; 62/129
[58] Field of Search ............... 62/125, 126, 127, 129, 62/130; 236/94; 165/11 R; 364/551, 557, 418; 73/112

[56] References Cited

U.S. PATENT DOCUMENTS

| | | | |
|---|---|---|---|
| 3,707,851 | 1/1973 | McAshan, Jr. | 62/129 X |
| 3,998,093 | 12/1976 | Bertolasi | 73/112 |
| 4,217,761 | 8/1980 | Cornaire et al. | 62/130 |
| 4,325,223 | 4/1982 | Cantley | 364/551 |
| 4,327,559 | 5/1982 | Spethmann | 62/126 X |
| 4,390,058 | 6/1983 | Otake et al. | 165/11 R |
| 4,432,232 | 2/1984 | Brantley et al. | 62/129 X |
| 4,483,152 | 11/1984 | Bitondo | 364/557 |
| 4,507,930 | 4/1985 | Kaya et al. | 364/551 X |
| 4,510,576 | 4/1985 | MacArthur et al. | 62/129 X |

FOREIGN PATENT DOCUMENTS 0033781 8/1981 European Pat. Off. .
2064818 6/1981 United Kingdom .

Primary Examiner—Harry Tanner
Attorney, Agent, or Firm—Silverman, Cass, Singer & Winburn, Ltd.

[57] ABSTRACT

A method of primarily testing and performance controlling heat pumps, refrigerating installations or corresponding systems, at which system thermal energy from at least one heat source (K) is supplied to an energy-carrying medium (1), a refrigerant, which circulates in the system and is advanced therein by at least one, preferably electrically driven compressor (2) and is caused to pass through at least one condenser (VVX) where thermal energy is emitted and exchanged to a thermal energy carrying medium, a thermal sink, where the control comprises the determining of real performance, such as thermal output ($\dot{Q}_1$) and so-called coefficient of performance (COP) against the background of measurements. The method is especially characterized in that performance, such as thermal output ($\dot{Q}_{1,f}$) or refrigerating output ($\dot{Q}_{1,f}$) and coefficient of thermal performance ($COP_f$) or coefficient of refrigerating performance ($\epsilon_f$), expected against the background of actual operation conditions is determined preferably automatically and continuously and compared automatically to corresponding real performance ($\dot{Q}_1$, COP, $\epsilon$) based on measurements. The invention also relates to an arrangement for carrying out the method.

22 Claims, 7 Drawing Figures

METHOD PRIMARILY FOR PERFORMANCE CONTROL AT HEAT PUMPS OR REFRIGERATING INSTALLATIONS AND ARRANGEMENT FOR CARRYING OUT THE METHOD

This invention relates to a method intended primarily to test and control the performance at heat pumps or refrigerating installations, comprising the determinining of real performance, such as thermal output and coefficient of performance, against the background of measurements. The invention also relates to an arrangement for carrying out the method.

The performance of a heat pump installation substantially is understood as the thermal output per time unit $\dot{Q}_1$ and the coefficient of performance COP, which is calculated from the relation $COP=\dot{Q}_1/\dot{E}_k$ where $\dot{E}_k$ is the drive input, normally electric power. The coefficient of performance normally is related to the total electric input, but other power can be used, for example compressor power. Corresponding energy amounts, of course, can be used, in which case $COP=Q_1/E_k$.

The performance of a refrigerating installation substantially is understood in a corresponding way as the refrigerating output, $\dot{Q}_1$, and the coefficient of performance $\epsilon$, determined from the relation $\epsilon=\dot{Q}_1/\dot{E}_k$, where $\dot{E}_k$ is drive input, normally electric power. The coefficient of performance normally is related to the total electric input, but other power can be used, for example compressor power. Corresponding energy amounts can be used, in which case $\epsilon=Q_1/E_k$.

The following description substantially deals with the application of heat pumps. The invention, however, as well can be applied to refrigerating installations, in which case normally the refrigerating capacity is measured instead of the thermal capacity.

In small installations performance control is carried out to a very small extent. In many installations of medium and large size thermal energies and electric energies are measured by means of heat volume indicators and, respectively, kWh-meters. This type of control does not yield a just and clear picture of the performance of the installation, not even during long periods of time and definitely not during dynamic processes, i.e. the substantially instantaneous efficiency of the installation at varying operation conditions. At measurements of this kind, namely, the efficiency of the heat pump or corresponding installation is not related to the actual operation conditions.

The present invention relates to a method, by which the efficiency of a heat pump can be controlled automatically and continuously under dynamic operation conditions, whereby new possibilities of primarily testing and operation control, but also of guarantee control are obtained.

The invention, thus, relates to a method of primarily testing and controlling the performance of heat pumps, refrigerating installations and corresponding systems, where thermal energy from at least one heat source is supplied to an energy-carrying medium, a refrigerant, which is circulated in the system and advanced therein by means of at least one, preferably electrically driven compressor and caused to pass through at least one condenser, where thermal energy is emitted and exchanged to a thermal energy carrying medium, a thermal sink, where the control comprises the determining of the real performance, such as thermal output and so-called thermal coefficient, against the background of measurements.

The method is characterized especially in that the performance, such as thermal output or refrigerating output and thermal or refrigerating coefficient of performance expected in view of the actual operation conditions, is determined preferably automatically and continuously and automatically compared to corresponding real performance based on mesurements.

The invention also relates to an arrangement for primarily testing and performance control of heat pumps, refrigerating installations or corresponding systems, where the system comprises an energy-carrying medium, a refrigerant, circulating in the system, which medium is intended to be advanced in the system by at least one, preferably electrically driven compressor, and at least one evaporator, at which thermal energy from a heat source is intended to be transferred to said energy-carrying medium, and at least one condenser, at which thermal energy is intended to be emitted by said energy-carrying medium to a second energy-carrying medium, a thermal sink.

The arrangement is characterized especially in that it comprises devices of substantially known kind for automatically determining the actual operation conditions in the form of measurement results or corresponding values, that it comprises devices for determining automatically and preferably continuously expected performance, such as thermal or refrigerating output and so-called thermal or refrigerating coefficient of performance, on the basis of said measurement results, that it comprises devices of substantially known kind for automatically determining measurement results required for determining the real performance corresponding to the expected one and for automatically determining said real performance, and that it comprises devices for automatically and preferably continously comparing between expected and real performance thus determined.

Figure 2:
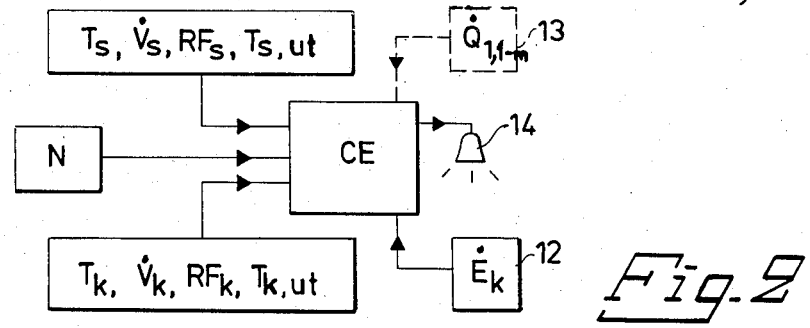
Figure 3:
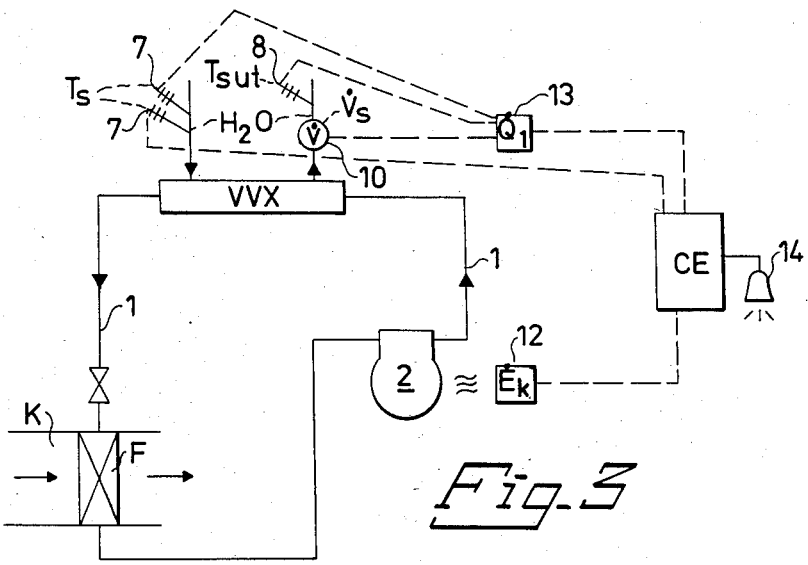
Figure 4:
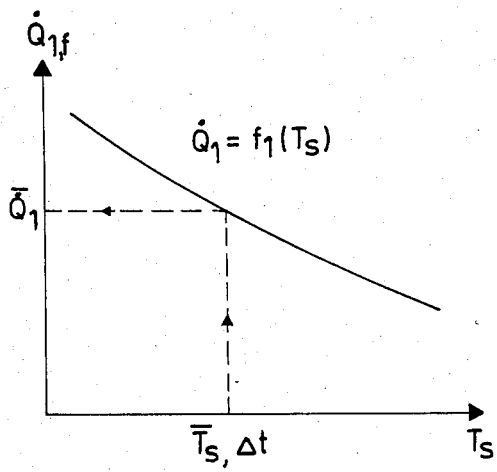
Figure 5:
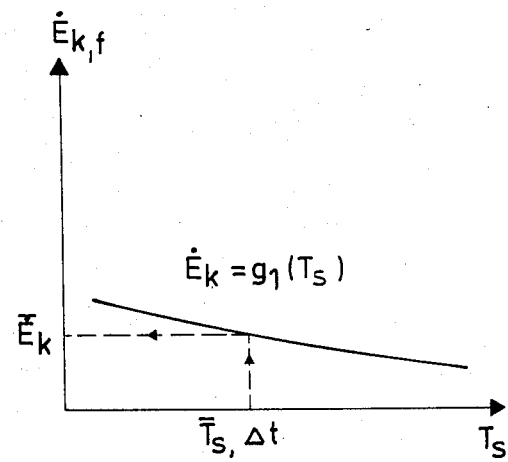
Figure 6:
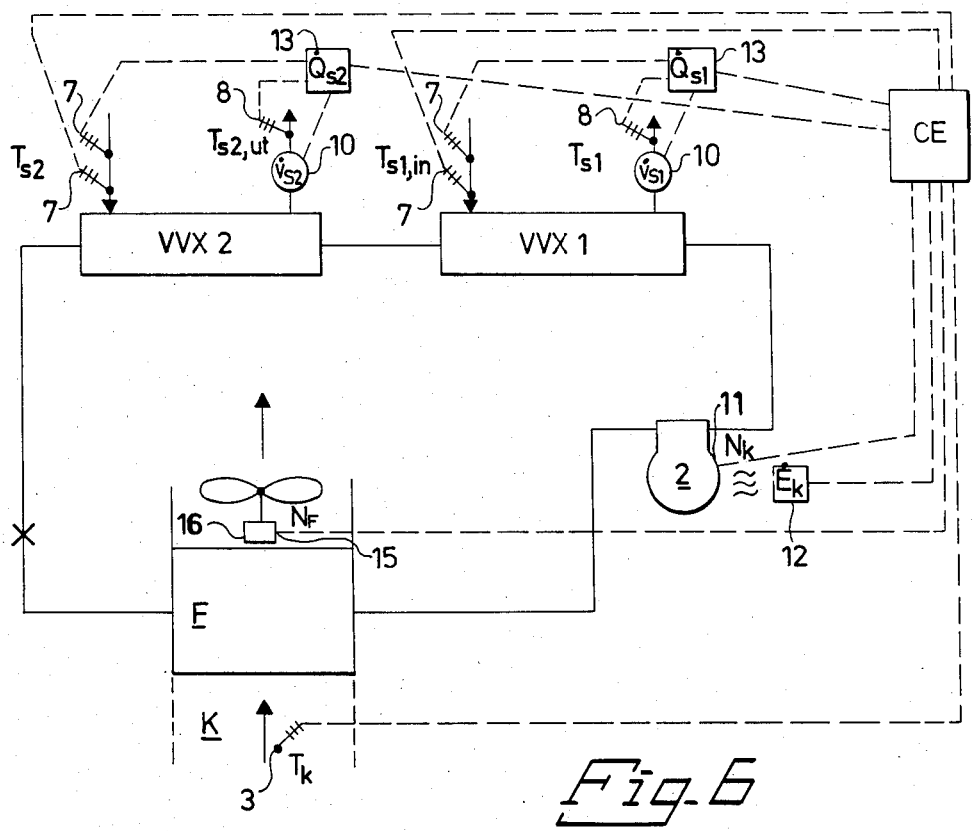
Figure 7:
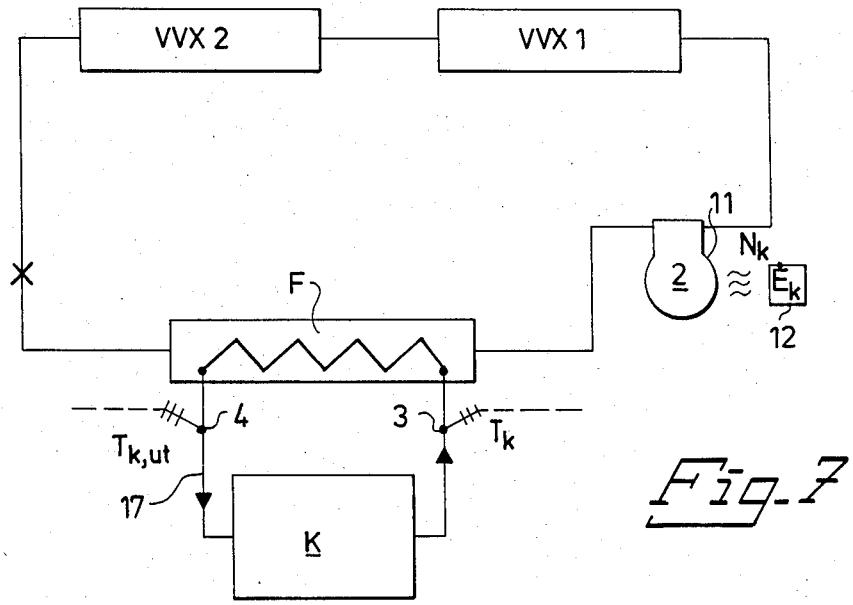

The invention is described in greater detail in the following, with reference to some embodiments thereof and to the accompanying drawings, in which FIG. 1 is a schematically shown block diagram of an embodiment of an arragement according to the invention at a heat pump shown in principle and generally, FIG. 2 is a more comprehensive block diagram of an arrangement according to the invention, FIG. 3 shows schematically a first simplified embodiment of an arrangement according to the invention, FIG. 4 is a basic diagram for determining expected thermal output based on operation conditions, FIG. 5 is a diagram corresponding to the one shown in FIG. 4, but applying to expected electric power input, FIG. 6 shows schematically a second simplified embodiment of an arrangement according to the invention, and FIG. 7 shows schematically a third simplified embodiment of an arrangement according to the invention.

At the general system, the heat pump, shown in FIG. 1 the characters K1 ... Kn designate an optional number of heat sources, and F1 ... Fn designate a corresponding number of evaporators arranged in known manner in the system, which comprises an energy-carrying medium 1, refrigerant, circulating in the system, which medium 1 is intended to be advanced in the system by means of at least one, preferably electrically driven compressor 2. At each evaporator F1 ... Fn thermal energy from the heat source K is intended to be transferred to said medium 1. The system also comprises an optional number of heat exchangers VVX1 . . . VVXn, at least one of which operates as condenser, where thermal energy at each heat exchanger XXV is intended to be emitted from said medium 1 and exchanged to a second thermal energy carrying medium, such as air or water, for being utilized.

Additional evaporators F can be imagined coupled in parallel at the same or a lower pressure than stated above.

According to the invention, in the general case devices 3, 4, 5 and 6 of substantially known kind are provided for determining measurement results $T_k$, $T_{k,ut}$ and, respectively, $\dot{V}_k$, $RF_k$, characterizing each heat source, where $T_k$ is the temperature of the energy-carrying medium of the heat source K on the inlet side, and $T_{k,ut}$ is the temperature on the outlet side, $\dot{V}_k$ is the flow of medium, and $RF_k$ is relative humidity, which is applicable to gaseous medium, such as air. Corresponding devices 7, 8, 9, 10 further are provided for determining measurement results $T_s$, $T_{s,ut}$ and, respectively, $\dot{V}_s$, $RF_s$, characterizing each thermal energy carrier, where $T_s$ is the temperature on the inlet side, and $T_{s,ut}$ on the outlet side, i.e. after exchange, $\dot{V}_s$ is the flow and $RF_s$ is relative humidity. For each compressor 2, further, devices 11,12 are provided for determining measurement results $N_k$ and, respectively, $\dot{E}_k$, or corresponding devices, characterizing the compressor 2, where $N_k$ refers to capacity control adjustment and $E_k$ to electric power input. The general system can be imagined also to comprise at least one fan 16 for advancing air, for example according to FIG. 6, and in applicable cases devices 15 are provided for determining the capacity control adjustment $N_F$ of the fan.

The measurement results or corresponding values according to above describe the real operation conditions of the heat pump and constitute a basis for determining expected performance and real performance of the system.

The measurement results according to above, as shown schematically in FIG. 2, are intended automatically and preferably continuously to be transferred in the form of signals to a central unit CE or corresponding device, which preferably comprises a microcomputer, and which contains information on expected performance, such as thermal output $\dot{Q}_{l,f}$ and electric power input $\dot{E}_{k,f}$ as a function of some of the measurement results. In the general case the following applies $$\dot{Q}_{1,f} = f(T_{k1}, T_{k2}, \ldots, T_{kn}, \dot{V}_{k1}, \dot{V}_{k2}, \ldots, \dot{V}_{kn}, RF_{k1}, RF_{k2},$$
$$\ldots RF_{kn}, T_{s1}, T_{s2}, \ldots T_{sm}, \dot{V}_{s1}, \dot{V}_{s2}, \ldots V_{sm}, RF_{s1}, RF_{s2},$$
$$\ldots, RF_{sm}, N_{k,1}, N_{k,2} \ldots N_{k,p}, N_F)$$

$$\dot{E}_{k,f} = g(T_{k1}, T_{k2}, \ldots, T_{kn}, \dot{V}_{k1}, \dot{V}_{k2}, \ldots, \dot{V}_{kn}, RF_{k1}, RF_{k2},$$
$$\ldots RF_{kn}, T_{s1}, T_{s2}, \ldots T_{sm}, \dot{V}_{s1}, \dot{V}_{s2}, \ldots V_{sm}, RF_{s1}, RF_{s2},$$
$$\ldots, RF_{sm}, N_{k,1}, N_{k,2} \ldots N_{k,p}, N_F)$$

The said unit is capable, preferably continuously and on the basis of relevant measurement results, to determine expected performance. The unit CE further is capable, on the basis of measurement results for determining real performance, preferably continuously to determine real performance and preferably continuously to compare expected and real performance thus determined.

In many installations of the type here concerned, heat volume indicators 13 of known kind, marked in FIGS. 1 and 2, and kWh-meters for measuring thermal and, respectively, electric energies are provided. Such existing measuring instruments 12,13 preferably are used for determining true values concerning thermal energy output and electric energy input and/or corresponding effects, and in applicable cases as basic values for calculating rated values. The flow of thermal energy carrier, for example, at the arrangement according to the invention can be used at the calculation of expected heat emission.

In FIG. 3 showing a first embodiment of a specific simple system the heat source K is air from a residential building or the like, from which thermal energy is intended to be exchanged to the energy-carrying medium 1 at the evaporator F. In connection to the condenser VVX thermal energy is intended to be exchanged to tap hot water or corresponding liquid. By means of devices 7,8,10,12,13 of a suitable kind and designated as in FIG. 1, $T_s, T_{s,ut}$ and, respectively, $\dot{V}_s, \dot{E}_k$ and $\dot{Q}_l$ are intended to be measured. The central unit CE here is capable from these measurement results to determine expected and real performance, and remaining parameter values required for said determination are pre-determined, for example empirically, and stored as constants in the central unit.

At the second embodiment of a specific system shown in FIG. 6, exterior air and/or used air are used as heat source. Devices 7, 8 and 10 with the same designations as in FIG. 1 are provided on the heat emitting side for measuring the temperature of the thermal energy carrying medium, the thermal sink, before $T_{s1}, T_{s2}$, and after $T_{s1,ut}, T_{s2,ut}$ the heat exchangers VVX1, VVX2, in this case two and, respectively, flow $\dot{V}_{s1}, \dot{V}_{s2}$ of said thermal energy carrying medium through each heat exchanger. The first heat exchanger VVX1 is utilized preferably for the heating of tap hot water, and the second heat exchanger VVX2 preferably is utilized for the heating of radiator water. For determining thermal output, heat volume indicators 13 are provided, and emitted heat amounts are intended to be transferred to and be registered in the central unit CE. Information concerning the temperature $T_{s1}, T_{s2}$ of incoming water or the temperature $T_{s1,ut}, T_{s2,ut}$ of outgoing water also is intended to be transferred to the central unit.

Devices 11,12 are provided for taking up measurement results for the compressor(s) 2 concerning power input $E_k$, inclusive of electric motor(s), and capacity control adjustment $N_k$. Devices 3,15 also are provided for taking up measurement results concerning the temperature $T_k$ of the air into the evaporator(s) F, as well as capacity adjustment $N_F$ of the fan(s) 16 provided for advancing the air. The measurement results $\dot{E}_k, N_k, T_k$ and $N_F$ are intended to be transferred to the central unit CE.

In FIG. 7, by means of a third, schematically shown embodiment, the case is exemplified where heat is taken from a liquid by means of the evaporator F. This can take place directly from the heat source K when the liquid is water from a lake, the sea, a running water course, subsoil water or waste water. Devices 3,4 are provided for measuring the temperature $T_k, T_{k,ut}$ of incoming and/or outgoing water, respectively. The heat can also be taken up indirectly from the heat source, which can be, for example, water of some kind, air, soil or rock. A heat transfer medium (brine) 17 is provided for transferring the heat from the heat source to an evaporator, where heat is intended to be exchanged to the heat transfer medium. When problems exist of measuring the temperature of the heat source in a representative way, the incoming or outgoing temperature of the heat transfer medium, instead, can be measured. The measurements concerning the hot side and the compressor(s) are the same as according to FIG. 6 and substantially are not shown in FIG. 7.

A simplified method of performance control in an installation according to the invention comprises control of and judgement on the utilization time of the installation. The magnitudes controlling the operation of the installation according to the normal control equipment are intended to be measured. The central unit CE is capable to decide whether or not the installation shall be operative. The central unit further is to be supplied with information on whether or not the electric power supply is in function.

The central unit is capable, when the installation is not operative, to control whether the operation conditions are such that the installation shall not be operative. When this is the case, no measure is intended to be carried out. When, however, the measurement results prove the operation conditions to be such, that the installation should be in operation, alarm of some kind is intended to be given, and preferably a time checking is started, by means of which, thus, "unintentional downtime" is registered, and which is intended to go on until the installation is started or the operation conditions are changed so that operation is not longer intended to occur.

The alarm function, as for the more complicated equipments according to above, can be connected directly to telephone whereby an automatic call-up is intended to occur.

At the system according to FIG. 6, for example, at the simplified method of performance control described last, the temperature $T_k$ and the temperatures on the hot side controlling the operation of the heat pump are intended to be measured.

The mode of operation of the arrangement according to the invention and the method according to the invention substantially should have become apparent from the aforesaid.

In view of the fact that the operation conditions, under which the system, the heat pump, operates, substantially affect the performance thereof, according to the invention these conditions are mapped continuously by measurements of varying scope, as described with reference to FIGS. 1, 2, 3, 6 and 7, depending on the accuracy desired. The general functions f and g, at the embodiment according to FIGS. 1 and 2, are stored in the central unit and used for automatically and continuously determining the expected thermal output $Q_{1,f}$ and the expected electric power input $\dot{E}_{k,f}$ on the basis of automatic and continuous measuring. By integration over the time corresponding expected energy amounts are obtained.

The function describing $\dot{Q}_{1,f}$ and $\dot{E}_{k,f}$, of course, are adapted to the system in question, the scope of measurements etc,. and can vary in complexity. At the system according to FIG. 3, thus, the functions $f_1$ and $g_1$, FIGS. 4 and 5, are simple and yield mean values for $\dot{Q}_{1,f}$ and $\dot{E}_{k,f}$ as the function of $\overline{T}_s$, which is a mean value of $T_s$ applying to a certain period of time, When, for example, $\dot{V}_s$ varies, a curve score is obtained in each diagram.

Real electric power input during a certain time is measured by means of kWh-meters. Real thermal energy output during the corresponding time is measured by means of heat volume indicators on the basis of measurements concerning $T_s, T_{s,ut}$ and $\dot{V}_s$ or is calculated in the central unit on the basis of these measurements.

From continuously determined values for $\dot{Q}_{1,f}, \dot{E}_{k,f}, \dot{Q}_1$ and $\dot{E}_k$, $COP_f$ and COP are calculated, and expected and real values of Q and COP are compared. The central unit preferably is capable at a pre-determined difference between expected and real value to initiate alarm to rise, for example by acoustic and/or optic signal 14, marked in FIGS. 1, 2 and 3. It should not be suitable in practice to measure performance entirely continuously, but measuring, instead, occurs during pre-determined steps of time as mean values.

Variants of the arrangement and method other than those set forth above can be imagined. At a simplified variant, for example, only $T_s$, $T_{s,ut}$, $T_k$ and $T_{k,ut}$, FIG. 1, are measured. For determining $\dot{Q}_1$ and $\dot{E}_k$ in this case, the following relation for a system according to FIG. 1 can be set up $$\dot{Q}_1 = \sum_{i=1}^{m} (k_{si} \cdot \Delta T_{si})$$

$$\dot{Q}_2 = \sum_{i=1}^{n} (k_{ki} \cdot \Delta T_{ki})$$

$$\dot{Q}_1 = \dot{Q}_2 + h \cdot \dot{E}_k$$

where $k_{si}$ and $k_{ki}$ are regarded to be constants and constitute the product of the respective flow and thermal permittivity, and where $\Delta T$ designates a temperature difference calculated as the absolute difference between the inlet and outlet temperature of a medium. h is a function describing the size ($h \leq 1$) of the losses and depends on the temperature of the thermal sink and heat source and is stored in the central unit as well as functions $f_2$ and $g_2$. The actual values for $Q_1$ and E are calculated by integration over the time.

At the embodiment according to FIG. 6, thus, $\dot{Q}_{s1}$ and $\dot{Q}_{s2}$ are measured by means of heat volume indicators (via measurement results concerning $T_{s1}$, $T_{s2}$, $T_{s1,ut}$, $T_{s2,ut}$ and $\dot{V}_{s1}$ and $\dot{V}_{s2}$) and $T_{s1}$ and $T_{s2}$ or $T_{s1,ut}$ and $T_{s2,ut}$ as well as $\dot{E}_k$, $N_k$, $T_k$ and $N_F$. The functions describing $Q_{1,f}$ and $\dot{E}_{k,f}$ are here adapted for calculation on the basis of these parameters.

At the embodiment according to FIG. 7, measurement and performance control are carried out in a way corresponding to FIG. 6, with the difference that no fan is provided.

At the simplified method of performance control comprising control of and judgment on the utilization time of an installation, of course, several different variants can be imagined, depending on the construction and function of the installation. The control method, however, should be obvious in view of the above description. The performance in this case is synonymous with operation or not. Operation can be scanned, for example, as motor current to the compressor. The magnitudes controlling the operation of the installation according to the normal control equipment can comprise, for example, several temperatures and thermostat settings.

At the simplified variants, the values, which are not measured but are required for determining expected and real performance, are pre-determined, for example empirically, and stored in the central unit and processed as constants at the performance determination.

The functions f,g,f$_1$,g$_1$,f$_2$ and g$_2$ and similar ones of the same kind for determining expected values can be established primarily in two ways.

The functions can be determined by the system supplier to be stored in the central unit in connection with the installation of the heat pump. Preferably possibility is provided here for a simple change of the functions.

The central unit also can be capable to register at operative system definite real performance achieved when the system operates in the way intended, and to utilize performance thus registered as expected performance at said comparison.

The first way is particularly suitable when the method and arrangement according to the invention are used for guarantee measurements. The second way can be used at pure operation control.

As should have become apparent from the aforesaid, the invention offers the possibility of a highly accurate control of the function of a heat pump or the like. By function control on the basis of expected function with regard paid to the operation conditions, functional disorder can be detected rapidly. The flexibility in respect of adaptation to systems of different complexity is also very great.

The invention has been described above with reference to some embodiments. More embodiments, of course, and minor alterations can be imagined without abandoning the invention idea.

The calculation method at the performance determination, for example, has been dealt with to a small extent. The calculations can be carried out in several ways, for example in fixed steps of time of varying length, etc. At several components of similar kind, heat sources, thermal sinks, etc., an addition is made in an obvious manner at the determination of performance.

The arrangement according to the invention, of course, can be provided with equipment, for example a printer, for explicit recordal of operation results and performance.

Transmitters for carrying out the measurements according to the invention, as mentioned, are of known type. For temperature, for example, resistance transmitters are used, and for flows, for example, rotary or inductive transmitters are used at liquid and, for example, hot-wire anemometers at air.

Variants of the method and arrangement according to the invention also can be imagined, at which an alarm signal 14 of some kind is emitted also/or when during a certain longer time a distinct trend concerning continuous deterioration of real performance compared to expected performance has been registered.

The invention, thus, must not be regarded restricted to the embodiments described above, but can be varied within the scope of the attached claims.

I claim:

1. A method of primarily testing and performance control of heat pumps, refrigerating installations or corresponding systems, in which system thermal energy from at least one heat source is supplied to an energy-carrying medium such as a refrigerant, which circulates in the system and is advanced therein by at least one compressor and caused to pass through at least one condenser where thermal energy is emitted and exchanged to an energy-carrying medium such as a thermal sink, where the method includes the steps of determining actual values in the form of real performance of such parameters as thermal output and so-called coefficient of performance, against the background of measurements, and automatically and substantially continuously comparing said real performance values to nominal, ideal values representing corresponding expected performance values, characterized by the steps of determining said expected performance values, such as thermal output or refrigerating output ($Q_{1,f}$) and coefficient of thermal performance COP$_1$) or coefficient of refrigerating performance ($\epsilon_f$), automatically and substantially continuously based on actual operating conditions, which are substantially continuously determined by means of measurements.

2. A method as defined in claim 1, wherein said measurements include measuring parameters related to the heat source(s) (K), such as the temperature ($T_k, T_{k,ut}$), flow ($V_k$) and, at air, the relative humidity (RF$_k$) of its/their energy-carrying medium, and parameters relating to the thermal energy carrier(s), such as the temperature before ($T_s$) and after ($T_{s,ut}$) exchange, the flow ($V_s$) and, at air, the relative humidity (RF$_s$), and relating to the compressor(s) (2), such as electric energy input ($E_k$) and, said measurements being determined and transferred to a central unit (CE), which contains information on expected performance under different operation conditions, and which automatically determines expected performance corresponding to certain of said measurement results relating to operation conditions and compares the same to real performance, which is determined on the basis of certain of said the measurement results, such as electric energy input and temperature before and after exchange and flow concerning the thermal energy carrier.

3. A method as defined in claim 1, wherein only certain of the parameter values required for the determination of expected and real performance are measured or determined continuously, and further characterized in that remaining values are pre-determined, for example empirically, and processed as constants at the performance determination.

4. A method as defined in claim 3 wherein the heat source is spent air from a residential building or the like, and the thermal energy carrier is tap hot water or the like, and further characterized in that the temperature ($T_s, T_{s,ut}$) and the flow ($\dot{V}_s$) of the thermal energy carrier are measured, and thermal output ($\dot{Q}_1$) and electric power input ($\dot{E}_k$) are determined.

5. A method as defined in claim 3, further characterized in that the temperature ($T_k, T_{k,ut}$) of the energy-carrying medium of the heat source(s) (K) and the temperature ($T_s, T_{s,ut}$) of the thermal energy carrier(s) are measured, and functions for the determination of real thermal output ($\dot{Q}_1$) and electric power input ($\dot{E}_k$) are pre-determined empirically.

6. A method as defined in claim 3 wherein the heat source is spent air from a residential building or the like and/or exterior air, and the system preferably includes both tap hot water and radiator hot water as thermal energy carriers, and further characterized in that the temperature of the respective thermal energy carrier before ($T_{s1}, T_{s2}$) and after ($T_{s1,ut}, T_{s2,ut}$) heat exchange and the flow ($\dot{V}_{s1}, \dot{V}_{s2}$) of the respective thermal energy carrier are measured, that the heat amount emitted is measured by heat volume indicators, and that the measurement results or the like are taken up for the compressor(s) concerning power input ($\dot{E}_k$) and capacity control adjustment ($N_k$) and for the air concerning its temperature ($T_k$) before heat exchange and for the fan(s) (16) provided for the advancing of air concerning capacity control adjustment.

7. A method as defined in claim 3 wherein heat is taken from a heat source in liquid state, and the method includes providing both tap hot water and radiator hot water as thermal energy carrier, and is further characterized by the steps of measuring the temperature of the respective thermal energy carrier before ($T_{s1}, T_{s2}$) and after ($T_{s1,ut}, T_{s2,ut}$) heat exchange, measuring the flow ($\dot{V}_{s1}, \dot{V}_{s2}$) of the respective thermal energy carrier, measuring the heat amount emitted by heat volume indicators, and taking the measurement results for the compressor(s) (2) concerning power input ($\dot{E}_k$) and capacity control adjustment ($N_k$) and for the liquid concerning its temperature before ($T_k$) and/or after ($T_{k,ut}$) heat exchange or for the heat source ($T_k$), from which heat is taken by means of the refrigerant.

8. A method as defined in claim 2, further characterized in that the magnitudes, on the basis of which the operation of the system is controlled according to the existing control equipment of the system, are measured, and that determination automatically and substantially continuously is carried out whether the installation is operative and, if the installation is not operative, whether the installation is not expected to be operative against the background of the actual measurement results.

9. A method as defined in claim 8, further characterized in that time checking is started when it is determined that the installation is not operative although it is expected to be operative, which time checking goes on until the installation starts or the operation conditions are changed so that operation is not expected, whereby unexpected downtime is registered.

10. A method as defined in claim 1, further characterized in that real performance achieved when the system operates in the way intended is registered and used as expected performance.

11. A method as defined in claim 1, further characterized in that an alarm signal (14) is given when the difference between real performance and expected performance amounts to a pre-determined magnitude and/or when during a certain longer time a clear trend concerning continuous deterioration of real performance compared to expected performance has been registered.

12. An arrangement for primarily testing and performance control at heat pumps or refrigerating installations, where the system comprises an energy-carrying medium such as a refrigerant, which circulates in the system and is intended to be advanced in the system by at least one compressor and at least one evaporator, at which thermal energy from a heat source is intended to be transferred to said energy-carrying medium, and at least one condenser, at which thermal energy is intended to be emitted by said energy-carrying medium to a second thermal energy carrying medium such as a thermal sink, the system including means (3-11,15) for automatically determining the actual operating conditions in the form of measurement results and for automatically determining measurement results for determining actual values in the form of real performance, such as thermal output ($\dot{Q}_{1,f}$) or refrigerating output ($\dot{Q}_{1,f}$) and so-called coefficient of thermal performance (COPf) or coefficient of refrigerating performance ($\epsilon_f$), on the basis of said measurement results, means for automatically and substantially continuously comparing said actual values and nominal, ideal values in the form of corresponding expected performance; characterized by means for automatically and continuously determining said expected performance on the basis of said measurement results for said actual operating conditions.

13. An arrangement as defined in claim 12, further characterized by means for determining measurement results pertaining to the heat-source(s) (K), such as the temperature ($T_k, T_{k,ut}$) and flow ($\dot{V}_k$) and, at air, the relative humidity ($RF_k$) of its/their thermal energy carrying medium, and measurement results pertaining to the thermal energy carrier(s), such as the temperature before ($T_s$) and after ($T_{s,ut}$) heat exchange, the flow ($\dot{V}_s$) and, at air, the relative humidity ($RF_s$), and measurement results characterizing the compressor(s) (2), such as electric energy input ($\dot{E}_k$) and, which measurement results are intended in the form of signals to be transferred to a central unit (CE) or the like, which preferably comprises a microcomputer, and which contains information on expected performance, such as thermal output ($\dot{Q}_{1,f}$) and electric power input ($\dot{E}_{k,f}$) as a function of some of said measurement results, and which unit (CE) is capable, substantially continuously and the basis of these certain measurement results, to produce expected performance, and on the basis of measurement results for the calculation of real performance substantially continuously to determine real performance ($\dot{Q}_1$, COP) and substantially continuously to compare definite expected and real performance corresponding to each other.

14. An arrangement as defined in claim 12, including means for continuously determining only certain of the parameter values required for the determination of real and expected performance, and further characterized in that the remaining parameter values required for said performance determination exist, for example empirically, pre-determined and stored as constants in the central unit or the like.

15. An arrangement as defined in claim 14 wherein said heat source is spent air from a residential building or the like and the thermal energy carrier is tap hot water or the like, and further characterized by means (3,4,7,8,10,12,13) for substantially continuously determining the temperature ($T_s, T_{s,ut}$) and flow ($\dot{V}_s$) of the thermal energy carrier and thermal output ($\dot{Q}_1$) and electric power input ($\dot{E}_k$).

16. An arrangement as defined in claim 14, further characterized by means (3,4,7,8) for substantially continuously determining the temperature ($T_k, T_{k,ut}$) of the energy-carrying medium of the heat source(s) (K) and the temperature ($T_s, T_{s,ut}$) of the thermal energy carrier(s), and the central unit (CE) contains empirically pre-determined functions for determining real thermal output ($\dot{Q}_1$) and electrical power input on the basis of said temperatures ($T_k, T_{k,ut}, T_s, T_{s,ut}$).

17. An arrangement as defined in claim 14 wherein the heat source is spent air from a residential building and/or exterior air, and where the system includes both tap hot water and radiator hot water as thermal energy carrier, and further characterized in that it comprises means (7,8,10) for determining the temperature of the respective thermal energy carrier before ($T_{s1}, T_{s2}$) and after ($T_{s1,ut}, T_{s2,ut}$) heat exchange, and the flow ($\dot{V}_{s1}, \dot{V}_{s2}$) of the respective thermal energy carrier, and heat volume indicators (13) are provided for determining thermal output ($\dot{Q}_{s1}, \dot{Q}_{s2}$), and that it includes means (12,11,3,15) for determining the measurement results for the compressor(s) (2) concerning power input ($\dot{E}_k$) and capacity control adjustment ($N_k$) and for the air concerning its temperature ($T_k$) before heat exchange and for the fan(s) (16) provided for advancing the air concerning capacity control adjustment ($N_F$).

18. An arrangement as defined in claim 14 wherein heat is intended to be taken from a heat source in liquid state, to which heat from water is intended to be exchanged, and where the system includes both tap hot water and radiator water as thermal energy carrier, and further characterized in that it includes means (7,8,10) for determining the temperature of the respective thermal energy carrier before ($T_{s1},T_{s2}$) and after ($T_{s1,ut},T_{s2,ut}$) heat exchange, and the flow ($\dot{V}_{s1},\dot{V}_{s2}$) of the respective thermal energy carrier, and heat volume indicators (13) are provided for determining thermal output ($\dot{Q}_{s1},\dot{Q}_{s2}$), and that it includes means (12,11,3,4) for determining the measurement results or the like for the compressor(s) (2) concerning power input ($E_k$) and capacity control adjustment ($N_k$) and for the liquid concerning its temperature before ($T_k$) and/or after ($T_{k,ut}$) heat exchange.

19. An arrangement as defined in claim 14 further characterized in that it includes means for measuring the magnitudes, on the basis of which the operation of the installation is controlled according to the existing control equipment of the system, and that it includes means such as a central unit for automatically and substantially continuously determining whether the installation is operative, and when the installation is not operative, whether the installation is not expected to be opertive against the background of the actual measurement results.

20. An arrangement as defined in claim 19, further characterized in that it includes means for time checking capable to start when it is determined that the system is not operative although it is expected to be operative, which time checking is intended to go on until the installation starts or the operation conditions are changed so that operation is not expected, whereby unexpected downtime can be registered.

21. An arrangement as defined in claim 12, further characterized in that said central unit (CE) is capable of registering definite real performance achieved when the system operates in the way intended, and of utilizing performance thus registered as expected performance at said comparison.

22. An arrangement as defined in claim 12, further characterized in that said central unit (CE) is capable, at a predetermined difference between expected and real performance and/or when during a certain longer time a clear trend concerning continuous deterioration of real performance compared to expected performance has been registered, of initiating an alarm by means of an acoustic signal (14) or an optic signal.

* * * * *